United States Patent
Teboul (12)

(10) Patent No.: US 6,185,934 B1
(45) Date of Patent: Feb. 13, 2001

(54) DEVICE AND METHOD FOR FILTERING INTERNAL COMBUSTION ENGINE EXHAUST GASES AND VEHICLE EQUIPPED WITH SUCH A DEVICE

(76) Inventor: Daniel Teboul, 29, avenue de la Division Leclerc, 94230 Cachan (FR)

( * ) Notice: Under 35 U.S.C. 154(b), the term of this patent shall be extended for 0 days.

(21) Appl. No.: 09/202,896

(22) PCT Filed: Jun. 24, 1997

(86) PCT No.: PCT/FR97/01121

§ 371 Date: Dec. 22, 1998

§ 102(e) Date: Dec. 22, 1998

(87) PCT Pub. No.: WO97/49904

PCT Pub. Date: Dec. 31, 1997

(30) Foreign Application Priority Data

Jun. 25, 1996 (FR) .................................................. 96 08198

(51) Int. Cl.[7] ....................................................... F01N 3/00
(52) U.S. Cl. ................. 60/297; 60/289; 60/298; 60/308; 60/319; 60/311; 55/385.3; 55/DIG. 30; 96/58; 96/60; 95/69; 95/70
(58) Field of Search ............................... 60/297, 311, 319, 60/317, 308, 289, 290, 298; 55/385.3, 385.1, DIG. 39, DIG. 30, 302; 96/57, 58, 60; 95/69, 70, 78

(56) References Cited

U.S. PATENT DOCUMENTS

| | | |
|---|---|---|
| 3,228,755 | 1/1966 | Lottinville . |
| 3,417,549 | 12/1968 | Leosis . |
| 3,503,188 | 3/1970 | Gardner . |
| 4,020,915 | 5/1977 | Darnell et al. . |
| 4,338,784 | 7/1982 | Liu et al. . |
| 4,706,455 | 11/1987 | Johnsson . |
| 5,012,641 | 5/1991 | Travalee . |
| 5,085,049 | * 2/1992 | Rim et al. ............................... 60/274 |
| 5,492,677 | * 2/1996 | Yoshikawa ............................ 422/174 |
| 5,540,716 | * 7/1996 | Yamamoto ............................... 96/67 |
| 5,698,012 | * 12/1997 | Yoshikawa ............................... 96/47 |

FOREIGN PATENT DOCUMENTS

| | | |
|---|---|---|
| 316 252 | 11/1919 | (DE) . |
| 32 35 953 | 3/1984 | (DE) . |
| 0 346 803 | 12/1989 | (EP) . |
| 792603 | 4/1958 | (GB) . |
| 923431 | 4/1963 | (GB) . |
| 2218354 | 11/1989 | (GB) . |

OTHER PUBLICATIONS

Japanese Abstract No. 04–297341, vol. 017, No. 106 (M–1375), Mar. 4, 1993.

\* cited by examiner

*Primary Examiner*—Thomas Denion
*Assistant Examiner*—Binh Tran
(74) *Attorney, Agent, or Firm*—Evenson, McKeown, Edwards & Lenahan, P.L.L.C.

(57) ABSTRACT

The invention discloses a device for filtering internal combustion engine exhaust gases, comprising an electrostatic filtering chamber equipped with electrostatic filtering means, a line for supplying gases into the chamber, in fluid communication with an inlet of the chamber, at one of the ends of the supply line, the other end of the supply line being provided with an opening having an inlet orifice adapted to allow the penetration of the exhaust gases and of a flow of ambient air for cooling the exhaust gases. In this device, the means for drawing the exhaust gases and the air flow are mounted downstream of an outlet of the chamber, to allow the mixture of air and gases to pass into the said chamber and reject the filtered gases into the environment and a filter for coarse solid particles and droplets derived from the mixture is mounted in the chamber, upstream of the electrostatic filtering means.

27 Claims, 2 Drawing Sheets

DEVICE AND METHOD FOR FILTERING INTERNAL COMBUSTION ENGINE EXHAUST GASES AND VEHICLE EQUIPPED WITH SUCH A DEVICE

BACKGROUND AND SUMMARY OF THE INVENTION

The present invention relates to the elimination of polluting components, or of solid, liquid or gaseous impurities, from the exhaust gasses of an internal combustion engine.

A particular, but not exclusive, application is the purification of the exhaust gasses of a diesel engine.

Very many methods and devices for filtering internal combustion engine exhaust gasses have been proposed in the past.

In particular, there is known from the document GB-A-923 431, a method of eliminating solid, liquid and gaseous impurities from a flow of hot gasses in which the latter are conveyed and which comprises steps consisting of adding cool and clean air to the gasses in such a quantity and in such conditions that the flow of gasses is cooled down to a temperature below the point of condensation of that component from among the gaseous impurities that has the lowest boiling point, which means that the individual components forming the gaseous impurities condense successively and form droplets which are deposited on the liquid and solid impurities which are also contained in the flow of gas thus forming larger-sized particles. The liquid and solid particles thus obtained are then separated from the flow of gasses in a separating chamber.

In an application to an internal combustion engine, before the addition of the flow of cool and clean air, the flow of hot gasses is previously circulated in a heat exchanger in order to cool it and the separating chamber consists of an electrofilter.

There is also known, from the document EP-A-0 346 803, a method for continuously eliminating the soot and condensable volatile components from the exhaust gasses of a diesel engine, in which the hot exhaust gasses from the diesel engine are made to pass alternately through two heat exchangers, the soot and the condensable volatile components of the gasses being partially deposited on the surfaces of the heat exchanger. The exhaust gasses, cooled and charged with the remainder of the soot and of the condensable components, then pass into a coarse particles separator or a ceramic filter and then, in one of the embodiments of the invention, through an electrostatic separating device. When one of the heat exchangers is partially or totally clogged by the soot and the condensable volatile components, the latter is heated up and cleaned by combustion whilst the purification of the hot gasses takes place by passing through the other heat exchanger.

Such filtering methods and devices are relatively complex and are therefore expensive and not very easy to implement.

The present invention aims to overcome these disadvantages.

In particular, the invention proposes a filtering technology which is simple and easy to implement, whilst being at least as efficient as the existing technologies. It also proposes a filtering device which is compact and adaptable to any motor vehicle.

In order to do this it proposes, in a general manner, a device for filtering internal combustion engine exhaust gasses, comprising an electrostatic filtering chamber equipped with electrostatic filtering means, a line for supplying exhaust gasses into the filtering chamber, in fluid communication with an inlet of the filtering chamber, at one of the ends of the supply line, the other end of the supply line being provided with an opening whose inlet orifice is adapted to allow the penetration of the exhaust gasses and of a flow of ambient air intended for lowering the temperature of the exhaust gasses, characterised in that intake means, intended for drawing in the exhaust gasses and the air flow are mounted downstream of an outlet of the filtering chamber and in fluid communication with this outlet, in order to allow the mixture of exhaust gasses and air to pass into the said filtering chamber and to reject the filtered gasses into the environment and in that a filter for coarse solid particles and droplets derived from the mixture is mounted in the filtering chamber, upstream of the electrostatic filtering means.

The combination of a mechanical filter, electrostatic filtering means and the drawing through these things of a mixture of hot exhaust gasses and ambient cooling air makes it possible to filter these exhaust gasses in a particularly efficient and simple manner. Furthermore, the resulting device is compact and easy to use.

More particularly, the intake means make it possible to cause a mixture of hot exhaust gasses an ambient cooling air to penetrate into the supply line and to make this mixture pass into the filtering chamber at a constant flow rate.

Furthermore, the exhaust gasses are efficiently cooled and do not therefore damage the electrostatic filtering means.

Furthermore, the mechanical filter, particularly when the latter is constituted by an impingement-type filter, makes it possible to obtain a substantially constant pressure over the whole of the intake area of the electrostatic filtering means.

Preferably, another filter for solid particles and droplets is mounted downstream of the electrostatic filtering means, in the filtering chamber. Thus, the processing of the exhaust gasses in the electrostatic filtering means takes place in the whole of useful volume of these means, with no dead volume which could result in load loss phenomena.

Also preferably, an active carbon filter is mounted in the filtration chamber, downstream of the said other filter.

In order to prevent back-flow and turbulence phenomena, the opening of the exhaust gasses supply line comprises a conical nozzle whose wall is preferably pierced with holes.

In a preferred embodiment, the filtering means comprise two or more filtering stages.

The present invention also proposes a method of filtering the exhaust gasses of an internal combustion engine consisting in cooling the exhaust gasses by the addition of ambient air; in filtering these exhaust gasses in a filtering chamber equipped with electrostatic filtering means; characterised in that it consists in drawing the exhaust gasses and the ambient air flow through the filtering chamber and in filtering the mixture of exhaust gasses and ambient air by means of a filter for coarse solid particles and droplets, placed upstream of the electrostatic filtering means.

Advantageously, there is also filtered the mixture of exhaust gas and ambient air coming from the electrostatic filtering means, by means of another filter for solid particles and droplets.

Preferably, there is also filtered the mixture of exhaust gasses and ambient air coming from the other filter by means of an active carbon filter.

Finally, the present invention proposes a motor vehicle equipped with a filtering device such as defined above.

The supply line can be connected to the outlet of the exhaust silencer box or directly to the outlet of the exhaust manifold of the internal combustion engine and comprises means adapted to receive the corresponding outlet.

Furthermore, the filtering device can be installed in the boot or in the engine compartment of the vehicle.

BRIEF DESCRIPTION OF THE DRAWINGS

Other purposes, characteristics and advantages of the present invention will emerge from the following description, given with reference to the accompanying drawings in which.

DETAILED DESCRIPTION OF THE DRAWINGS

Figure 1:
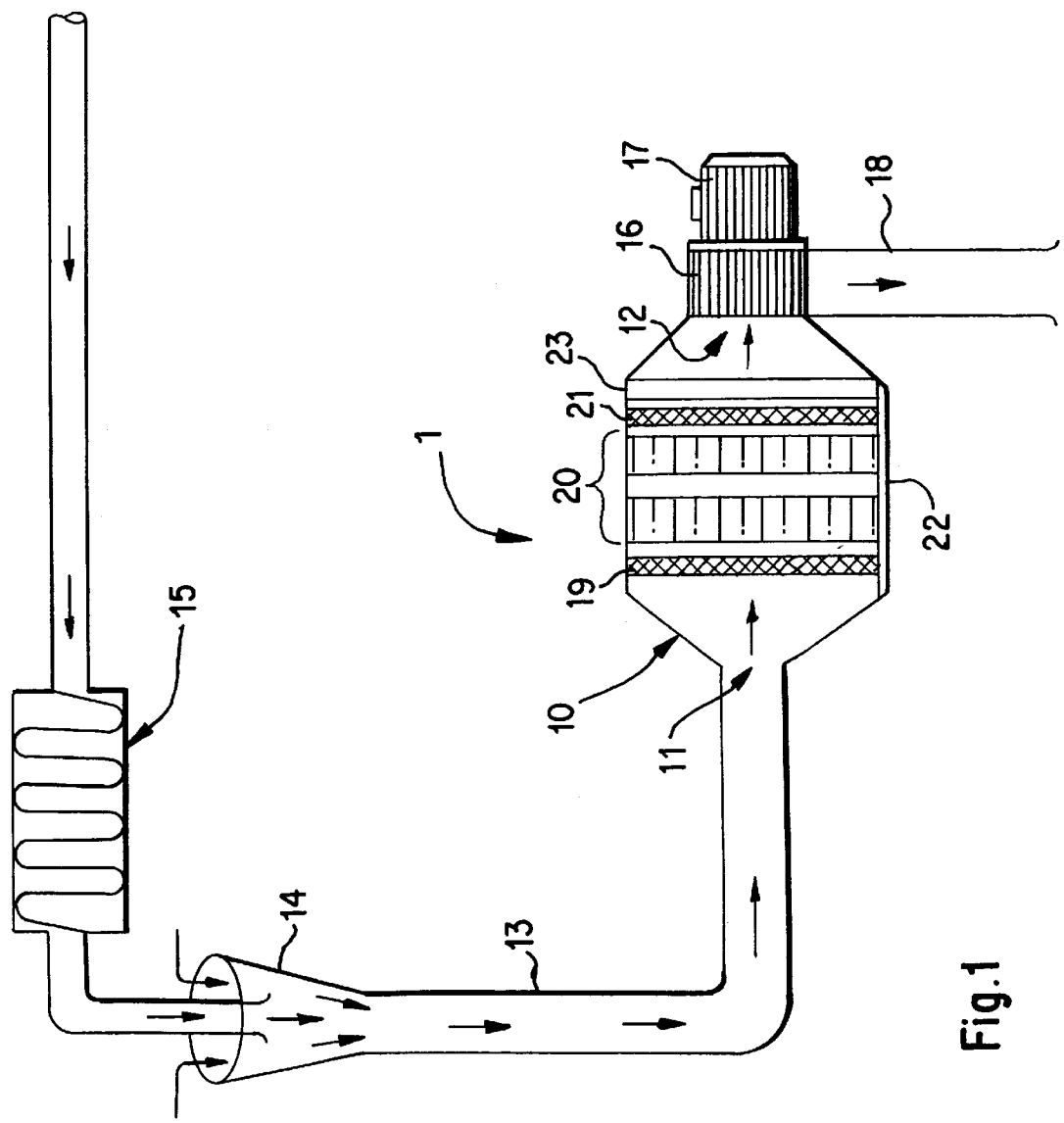
FIG. 1 is a basic diagram of a filtering device according one embodiment of the present invention.
Figure 2:
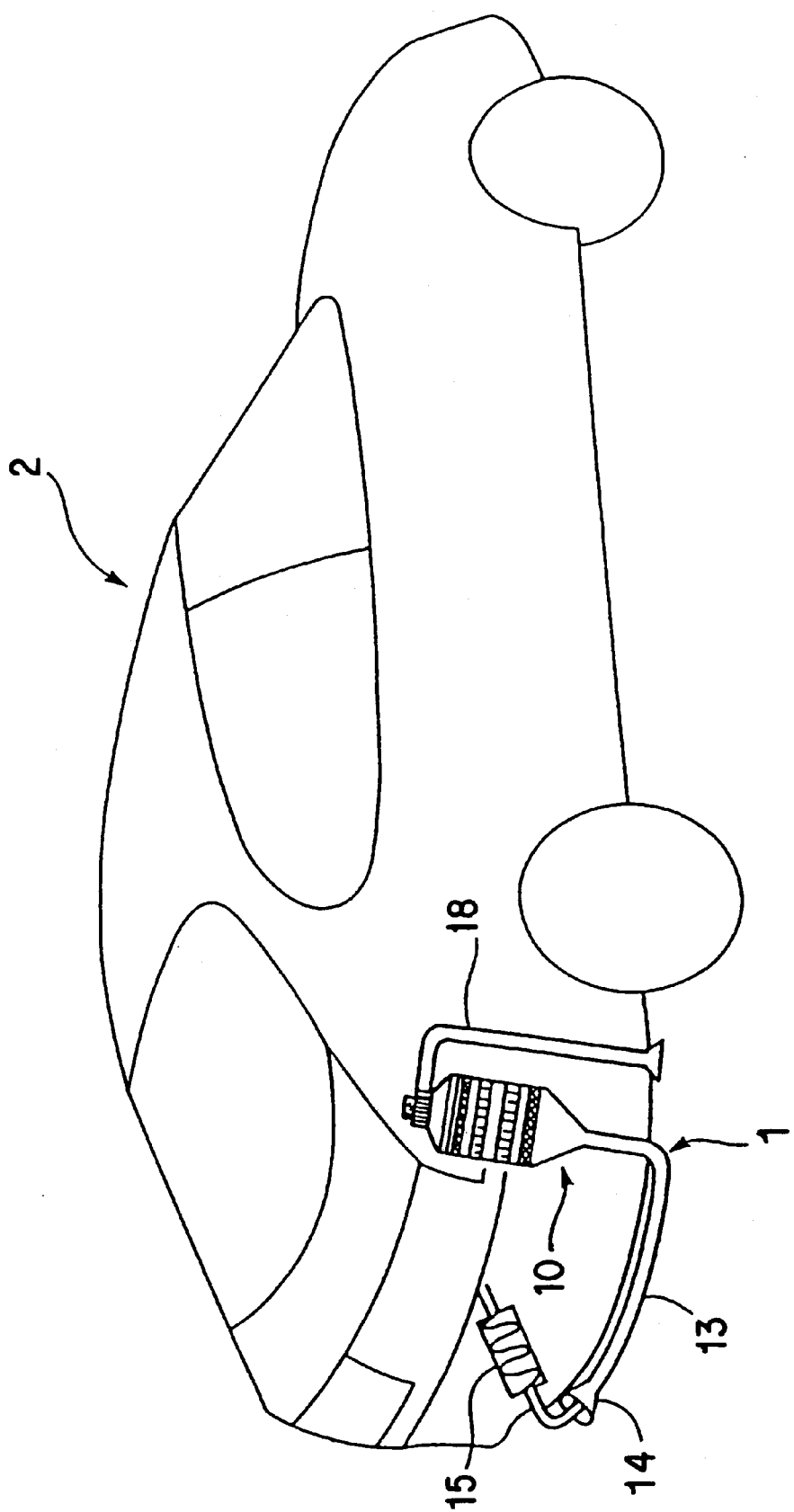
FIG. 2 is a diagram illustrating a motor vehicle equipped with the device of FIG. 1.

The device 1 for filtering internal combustion engine exhaust gasses shown in FIGS. 1 and 2 comprises a filtering chamber 10 having an inlet 11 and an outlet 12.

A line 13 for supplying exhaust gasses and ambient cool or cooling air is connected, by one of its ends, to the inlet 11. The other end of the supply line 13 is provided with an opening whose inlet orifice allows the penetration into the supply line of exhaust gasses coming from an internal combustion engine as well as the flow of ambient cooling air.

In this case, this opening consists of a conical nozzle 14 receiving the outlet orifice of an exhaust silencer box 15 of a motor vehicle 2, as illustrated in FIG. 2.

As can be seen again in FIG. 1, the conical nozzle 14 is located, in its widest part, in the axis of the exhaust outlet without being attached to it and in such a way as not to obstruct it and, in its narrow part, is connected to a duct of the supply line 13.

It will be noted here that, in other embodiments, the supply line 13 can be mounted in such a way as to absorb the exhaust gasses directly at the outlet of the exhaust manifold of the internal combustion engine.

Furthermore, in order to improve the penetration of the exhaust gasses and the flow of ambient cooling air into the supply line 13 and to allow the evacuation of the exhaust gasses into the environment in the case of possible clogging of the filtering device 1, the wall of the nozzle 14 and, if necessary, the start of the duct of the supply line 13 can be pierced with holes.

More generally, any other inlet structure can be used provided that the exhaust gasses and the flow of ambient cooling air can penetrate into the supply line 13 in an acceptable manner.

In practice, the inlet orifice of the supply line 13 has a cross-section which is twice that of the corresponding outlet orifice of the exhaust gasses and is facing either towards the rear of the vehicle, or towards the front of the vehicle.

Intake means 16, in this case a motor turbine, are mounted downstream of the filtering chamber 10 and in fluid connection with the outlet 12. They are driven by an electric motor 17 connected to the battery of the vehicle 2.

The exhaust gasses filtered by the device 1 are evacuated into the atmosphere, by the intermediary of an evacuation line 18 in fluid connection with the intake means 16.

The intake means 16 operate by depression in order to take in a quantity of ambient air, that is to say exterior to the exhaust gasses, sufficient to cool these exhaust gasses and not to damage the electrostatic filtering means of the filtering chamber 10 which will be described below. These intake means 16 furthermore operate in such a way as to have a constant flow rate all along the filtering device 1. In practice and whilst operating, substantially the same amount of ambient air as the amount of exhaust gasses penetrate into the supply line 13.

When the vehicle is stopped (idling conditions), the air will penetrate into the supply line 13 with a speed and in a quantity greater than the ejection of exhaust gasses.

Furthermore, the exhaust gasses are cooled, in practice, down to a temperature below 100° C. and preferably down to a temperature of less than or equal to 80° C.

The filtering chamber 10 comprises, after the inlet 11, a filter for coarse solid particles (small and medium grain sizes) and droplets, as well as a filter comprising a metal casing and several layers of very fine meshes, or an impingement-type filter.

The electrostatic filtering means 20, mentioned above, are, in this case, two-stage filtering means in order to obtain particularly effective filtering.

More precisely, they comprise:

an ionising section or a two-stage ioniser which makes it possible, by maintaining an electrical field, to electrostatically charge particles of the order of one hundredth of a micron;

a double-section collector cell with a large accumulation capacity consisting of plates with alternating positive and negative signs and capable of separating and retaining the micro-particles coming from the ionising section.

These electrostatic filtering means 20 produce voltages of the order of several thousand volts, by means of a power supply module (not shown) connected to the battery of the motor vehicle 2.

Furthermore, a second filter 21, of the same type as the filter 19, is mounted in the filtering chamber 10 downstream of the electrostatic filtering means 20.

The metal filter 21 intervenes principally when the electrostatic filtering means 20 are saturated or, for example, when an accumulation of solid particles detaches from the plates of the collector cell or capture cell and is carried by the flow of exhaust gas and air. It also has safety functions because it is installed upstream of an active carbon filter 23 described below.

In this respect, it will be noted that the filter 19 guarantees that the mixture penetrates over the whole of the inlet area of the electrostatic filtering means 20 with a constant pressure, whilst the filter 21 makes it possible to guarantee that the electrostatic filtering is carried out over the whole of the volume of the electrostatic filtering means 20. In other words, the use of these two filters 19 and 21 eliminates the harmful effects of load losses resulting from the narrowings at the inlet 11 and the outlet 12 of the filtering chamber 10.

A residues container 22 is mounted on the filtering chamber 10 in order to retrieve the impurities retained by the filters 19 and 21 and by the electrostatic filtering means 20.

Finally, an active carbon filter 23 is mounted in the filtering chamber 10, between the filter 21 and the outlet 12. This filter is intended to carry out a finishing filtering by gas adsorption, in particular the adsorption of stinking gasses which are not adsorbed by the solid particles of the exhaust gasses.

The filtering chamber 10 is of course made in such a way that it can be accessed in order to be able to clean the filters, by washing, or to be able to change the filters.

As shown in FIG. 2, the filtering device 1 is installed in the boot of the motor vehicle 2 using assembly means which are not shown.

Thanks to such a device, the exhaust gasses are cooled in an efficient manner before their entry into the filtering chamber 10, these gasses generally having a temperature of more than 400° C. before cooling.

In the case, for example, of a diesel engine, the filter 19 particularly retains carbonaceous particles, inorganic salts and other coarse dusts together with oily mists and emulsions contained in the exhaust gasses, and also water droplets coming from the outside ambient air and other diesel fuel emanations.

In this respect it will be noted that the filtering device 1 of the present invention filters not only the exhaust gasses of the motor vehicle 2 on which it is fitted, but also the ambient air loaded with polluting emissions.

In particular, thanks to its structure, this device is efficient, at low speeds and at high speeds, from the time of starting to the time of stopping the internal combustion engine of any motor vehicle whatsoever (car, boat, . . . ), without choking the engine.

The filtering device of the present invention also proves particularly advantageous in the case of petrol engines, in particular for the filtering out of lead particles contained in their exhaust gasses.

The present application is of course in no way limited to the embodiment which has been chosen and represented, but covers any variant within the scope of those skilled in the art.

In particular, the intake means 16 could be driven by the internal combustion engine, by the intermediary of a transmission belt. They could also consist of a motor-driven centrifugal fan or an extractor instead and in place of the motor-turbine.

It is also possible to provide an electrical circuit provided with an indicator lamp, intended to indicate the saturation of the electrostatic filtering means. A similar circuit can be provided to indicate the saturation of the active carbon filter 23.

The filter 21 can also be different from the filter 19 and can comprise, in particular, nets with a finer mesh. A filter, such as the filter 19 or 21, could also be provided between the two stages of the electrostatic filtering means 20. In this respect it will be noted that the dry filtering device 1 of the present invention can be adapted, by the choice of filters, to any internal combustion engine, guaranteeing that the major part of the polluting substances in the exhaust gasses are retained by the device. Furthermore, a combination of an impingement-type filter and another filter can be provided instead and in place of the single filter 19.

Furthermore, a mixer plate can be fitted between the inlet 11 and the filter 19.

Furthermore, the structure and the disposition of the constituent elements of the electrostatic filtering means can be different (several filtering cells side by side, number of stages chosen according to the cubic capacity of the engine . . . ).

Finally, the intake means could be coupled to the acceleration system of the vehicle in order to regulate the intake of ambient air.

What is claimed is:

1. A device (1) for filtering internal combustion engine exhaust gasses, comprising an electrostatic filtering chamber (10) equipped with electrostatic filtering means (20), a line (13) for supplying exhaust gasses into the filtering chamber (10), in fluid communication with a inlet (11) of the filtering chamber (10), at one of the ends of the supply line (13), the other end of the supply line (13) having an inlet adapted to allow the penetration of the exhaust gasses from an outlet of one of an exhaust silencer box and an exhaust manifold connectable to the internal combustion engine, while allowing the penetration of a flow of ambient air that does not come off the exhaust silencer box or exhaust manifold and which is intended for lowering the temperature of the exhaust gasses, wherein an intake unit (16), intended for drawing in the exhaust gasses and the air flow is mounted downstream of an outlet (12) of the filtering chamber (10) and in fluid communication with this outlet (12), in order to allow the mixture of exhaust gasses and air to pass into the said filtering chamber (10) and to reject the filtered gasses into the environment, and further wherein a filter (19) for coarse solid particles and droplets derived from the mixture is mounted in the filtering chamber (10), upstream of the electrostatic filtering means (20).

2. Device according to claim 1, wherein the filter is an impingement-type filter.

3. Device according to claim 2, wherein another filter (21) for coarse solid particles and droplets is mounted downstream of the electrostatic filtering means, in the filtering chamber (10).

4. Filtering device according to claim 3, wherein said other filter is an impingement-type filter.

5. Filtering device according to claim 4, wherein an active carbon filter (23) is mounted in the filtering chamber (10) downstream of the said other filter (21).

6. Device according to claim 1, wherein another filter (21) for coarse solid particles and droplets is mounted downstream of the electrostatic filtering means, in the filtering chamber (10).

7. Filtering device according to claim 6, wherein the said other filter is an impingement-type filter.

8. Filtering device according to claim 7, wherein an active carbon filter (23) is mounted in the filtering chamber (10) downstream of the said other filter (21).

9. Filtering device according to claim 6, characterised in that an active carbon filter (23) is mounted in the filtering chamber (10) downstream of the said other filter (21).

10. Filtering device according to claim 1 wherein the electrostatic filtering means comprise two or more filtering stages.

11. Device according to claim 1, wherein the inlet comprises a conical nozzle whose widest part is intended to receive the outlet of the one of the exhaust silencer box and the exhaust manifold.

12. Filtering device according to claim 11, wherein a wall of the conical nozzle is pierced with holes.

13. Filtering device according to claim 1, wherein the exhaust gasses are cooled down to a temperature of less than 100° C. and preferably down to a temperature of less than or equal to 80° C.

14. Filtering device according to claim 1, wherein it comprises means of fitting to a motor vehicle.

15. Motor vehicle (2) equipped with a filtering device (1) according to claim 1.

16. Method of filtering the exhaust gasses of an internal combustion engine, the method comprising the acts of:

provinding an exhaust gas outlet from one of an exhaust silencer box and an exhaust manifold connectible to the internal combustion engine;

receiving the exhaust gasses from the outlet of said one of the exhaust silencer box and the exhaust manifold, while simultaneously receiving an ambient air flow that does not come off the exhaust silencer box or exhaust manifold, said ambient air flow lowering a temperature of the received exhaust gasses;

drawing the exhaust gasses and the ambient air flow through a filtering chamber equipped with an electrostatic filter; and filtering the mixture of the exhaust gasses and ambient air flow via a filter for coarse solid particles and droplets, placed upstream of the electrostatic filter.

17. Method according to claim 16, wherein the mixture of exhaust gasses and ambient air coming from the electro static filter is also filtered by another filter for coarse solid particles and droplets.

18. Method according to claim 17, wherein the mixture of exhaust gasses and ambient air coming from the other filter is also filtered by an active carbon filter.

19. A motor vehicle, comprising:
an internal combustion engine which outputs exhaust gasses; and
a device for filtering said exhaust gasses, said device comprising:
an electrostatic filtering chamber (10) equipped with electrostatic filtering means (20), a line (13) for supplying exhaust gasses into the filtering chamber (10), in fluid communication with a inlet (11) of the filtering chamber (10), at one of the ends of the supply line (13), the other end of the supply line (13) having an inlet adapted to allow the penetration of the exhaust gasses from an outlet of one of an exhaust silencer box and an exhaust manifold connectable to the internal combustion engine, while allowing the penetration of a flow of ambient air that does not come off the exhaust silencer box or exhaust manifold and which is intended for lowering the temperature of the exhaust gasses, wherein an intake unit (16), intended for drawing in the exhaust gasses and the air flow is mounted downstream of an outlet (12) of the filtering chamber (10) and in fluid communication with this outlet (12), in order to allow the mixture of exhaust gasses and air to pass into the said filtering chamber (10) and to reject the filtered gasses into the environment, and further wherein a filter (19) for coarse solid particles and droplets derived from the mixture is mounted in the filtering chamber (10), upstream of the electrostatic filtering means (20).

20. A motor vehicle according to claim 19, wherein the filter is an impingement-type filter.

21. A motor vehicle according to claim 19, wherein another filter (21) for coarse solid particles and droplets is mounted downstream of the electrostatic filtering means, in the filtering chamber (10).

22. A motor vehicle according to claim 21, wherein the said other filter is an impingement-type filter.

23. A motor vehicle according to claim 21, wherein an active carbon filter (23) is mounted in the filtering chamber (10) downstream of the said other filter (21).

24. A motor vehicle according to claim 19, wherein the electrostatic filtering means comprise two or more filtering stages.

25. A motor vehicle according to claim 19, wherein the inlet comprises a conical nozzle whose widest part is intended to receive the outlet of the one of the exhaust silencer box and the exhaust manifold.

26. A motor vehicle according to claim 25, wherein the a wall of the conical nozzle is pierced with holes.

27. Filtering device according to claim 19, wherein the exhaust gasses are cooled down to a temperature of less than 100° C. and preferably down to a temperature of less than or equal to 80° C.

* * * * *